United States Patent [19]

Balko et al.

[11] 4,012,297
[45] Mar. 15, 1977

[54] MERCURY RECOVERY AND RECYCLE PROCESS

[75] Inventors: Edward Nicholas Balko, Trenton, Mich.; William Francis Schmitt, Port Edwards, Wis.; Shyam Dattatreya Argade, Woodhaven, Mich.

[73] Assignee: BASF Wyandotte Corporation, Wyandotte, Mich.

[22] Filed: Jan. 16, 1976

[21] Appl. No.: 649,817

[52] U.S. Cl. ............................................. 204/99
[51] Int. Cl.² ........................................... C25B 1/36
[58] Field of Search ..................................... 204/99

[56] References Cited

UNITED STATES PATENTS

| | | | |
|---|---|---|---|
| 3,691,037 | 9/1972 | Updyke | 204/99 |
| 3,755,110 | 8/1973 | Wygasch et al. | 204/99 |
| 3,785,942 | 1/1974 | Carlson | 204/99 |
| 3,801,480 | 4/1974 | Krieg | 204/99 |
| 3,836,442 | 9/1974 | Dean et al. | 204/99 |
| 3,895,938 | 7/1975 | Klotz | 204/99 |

*Primary Examiner*—R. L. Andrews
*Attorney, Agent, or Firm*—Norbert M. Lisicki; Bernhard R. Swick; Robert E. Dunn

[57] ABSTRACT

In the process of producing chlorine and caustic soda employing mercury amalgam electrolytic cells, mercury losses occur in both solid and liquid plant waste streams. This invention provides for an integrated system in which mercury is extracted from plant waste streams, the waste streams are discharged, and the mercury recovered by electro-reduction in the plant electrolytic cells.

5 Claims, 1 Drawing Figure

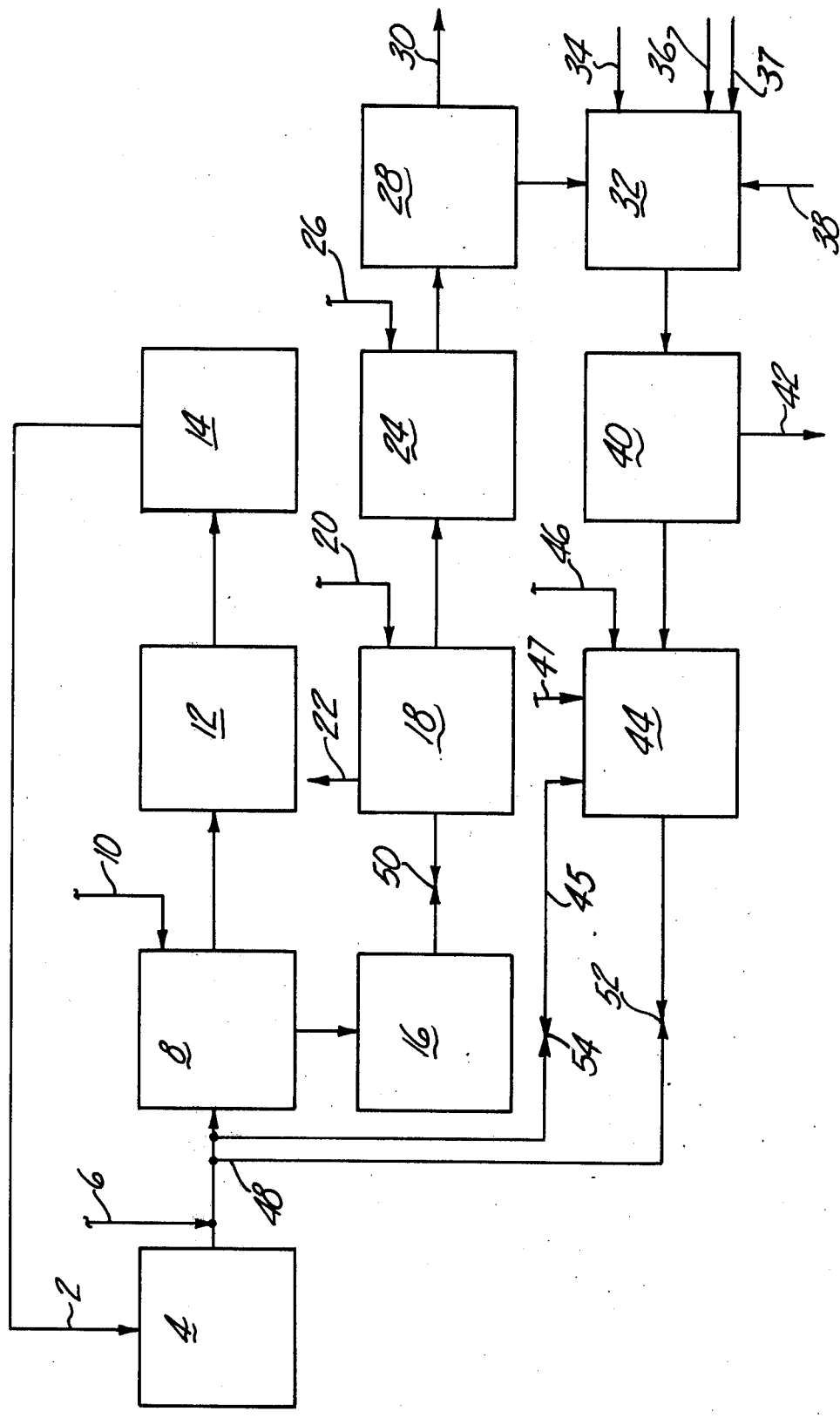

MERCURY RECOVERY AND RECYCLE PROCESS

BACKGROUND OF THE INVENTION

1. Field of the Invention

This invention relates to the production of chlorine and caustic employing mercury amalgam cells and, more particularly, to the prevention of mercury contamination by plant effluent streams to the environment and to the recovery of mercury from said streams. This process is particularly adaptable to the use of a poor grade of sodium chloride, namely, one which assays from about 95–98 percent sodium chloride.

2. Description of the Prior Art

The mercury amalgam electrolytic cell for the production of chlorine and caustic has been used primarily because of the high grade caustic soda which is produced. However, the loss of mercury from the effluent streams issuing from these electrolytic cells creates serious ecological problems. Furthermore, the loss of mercury is a costly expenditure in the caustic and chlorine producing plants. Accordingly, it is imperative that means are found for the removal and recovery of mercury and/or other heavy metal ions from both solid and liquid plant effluents.

U.S. Pat. No. 3,788,842 teaches the treatment of a stream containing mercury with steel turnings. U.S. Pat. No. 3,836,442 employs a sulfide process for the extraction of mercury from solid wastes. U.S. Pat. No. 3,755,110 and 3,691,037 teach the treatment of mercury sludge with sodium hypochlorite. None of the patents teach the totality of the invention as claimed in this application which treats both solid and liquid waste in one process.

SUMMARY OF THE INVENTION

We have found that mercury from all plant waste streams, including solids, can be economically recovered. The brine sludge solids containing mercury are treated with spent sulfuric acid from the chlorine gas drying towers, solubilized with an oxidant, combined if desired with all other liquid plant streams containing mercury, concentrating the mercury as the sulfide, filtration, followed by solubilization of the recovered HgS employing an oxidant and returning the mercury to the electrolysis cells via the brine stream.

BRIEF DESCRIPTION OF THE DRAWING

The drawing illustrates a flow diagram of the mercury amalgam electrolytic cell process, specifically the brine cycle and the mercury recovery cycle.

DESCRIPTION OF THE PREFERRED EMBODIMENTS

The present invention can best be described by reference to the attached drawing. In the drawing, a brine stream 2 which has been depleted in the mercury cell 12 and has been dechlorinated at 14 is brought to saturation by passing brine steam 2 through a bed of solid rock salt in a saturator tank 4. A sodium carbonate solution 6 is added to brine stream 2 which stream is then pumped into clarifier 8 wherein a solution of sodium hydroxide 10 is added whereupon the insoluble impurities are settled and stored in collection tank 16 together with a 5 to 10 gallon per minute brine purge stream from clarifier 8. Brine stream 2 is then electrolyzed in mercury cell 12, stripped of chlorine at dechlorinator tower 14 and depleted brine stream 2 is returned to saturator tank 4.

The slurry from collection tank 16 is transferred to mixing tank 18 where it is reacted with spent sulfuric acid 20 from chlorine drying towers (not shown). This provides for including the mercury in the acid into the recovery cycle and simultaneously provides for neutralization of the acid. Any carbon dioxide 22 produced during this neutralization is vented from the tank. The resulting slurry is transferred to reactor tank 24, the pH is adjusted from about 6.0 to about 9.0 and sufficient oxidant 26 is added to oxidize all of the metallic mercury and insoluble mercury salts to the soluble $Hg^{+2}$ ion form. The oxidant may be sodium hypochlorite which has free NaOH present or if chlorine gas is employed, then additional NaOH may be required. The slurry is then filtered on filter wheel 28 employing a polypropylene filter cloth. The resulting filter cake is washed with water and the solids 30 which are discharged are removed to a suitable waste disposal such as a landfill. The filtrate from filter wheel 28 including the wash water is collected in tank 32 where other liquid plant waste stream 34 such as sump and wash streams containing dissolved mercury are combined with the filtrate. Residual oxidant is destroyed by the addition of either sodium thiosulfate or sodium bisulfite 36. The pH of the solution is then adjusted from about 2.5 to about 6 preferably about a pH of 3 employing a solution of hydrochloric acid 37 and an excess of NaHS 38 is added to form insoluble mercury sulfide. The mercury sulfide is filtered through a paper filter 40 which contains a cake of cellulose filter aid built upon it. The filtrate 42 essentially devoid of mercury is sewered. The filter cake from 40 is then slurried in plant brine 45 employing mechanical agitation in tank 44 to cause a fine dispersion of the cellulose filter medium and the mercury sulfide. A conventional agitator may be employed but in the preferred embodiment it is desirable to use a special high shear dispersion mixer such as the "SUPER DISPAX" manufactured by Tekmar Inc. The dispersion is then treated with oxidant 46 after the pH of the slurry is adjusted with sodium hydroxide 47 to a value from about 8 to about 10 preferably a pH of 9. The quantity of oxidant added assuming sodium hypochlorite is employed, is within the range of about 3 to about 6 moles of hypochlorite added per mole of mercury sulfide present and preferably about 5 moles. If the pH is appreciably below 8 some oxidant may be lost due to a reaction with the cellulose filter matrix while a pH appreciably above 10 may precipitate some of the mercury as mercuric oxide. The resulting mixture containing cellulose fibers and particles suspended in a mercuric chloride sodium chloride solution is then injected into the brine stream between the saturator 4 and clarifier 8 at point 48. The entire mercury recovery process may be kept isolated from the caustic chlorine process by closing off valves 50, 52 and 54.

The oxidant employed in the process may be either sodium hypochlorite or hypochlorous acid which may be produced by adding chlorine gas to either an alkaline or an acidified brine solution until an amount of chlorine gas sufficient to oxidize all of the mercury is solubilized.

The pH range employed for the extraction of the mercury from the brine muds in collection tank 16 is from about 6.0 to about 9.0, preferably from about 6.0 to about 6.5.

The process of this invention in a single processing system treats all mercury chlorine plant solid and liquid wastes. This invention has substantial advantages over the prior art in that it:

1. Provides a purge to the plant brine system for the control of undesirable impurities, i.e., sulfate ion.
2. Performs well with a salt of relatively high impurity levels containing from 0.5 to 5 percent impurities.
3. Provides a mercury removal and disposal system for spent sulfuric acid from the plant chlorine drying towers.
4. Provides a mercury removal process for all waste liquid streams in the plant and is not restricted to tailbox wash water. More particularly, sump and wash streams are treated without the need for separate processing.
5. Does not require separate purification of the soluble mercury solution recycled to the brine system.
6. Provides for an efficient extraction of mercury from brine muds and produces a filter cake which is more easily filtered and handled.

This invention has the further advantage that soluble contaminants contained in the liquid waste streams are kept separate from the brine system and are sewered.

The temperature of the effluent streams can range from about 10° Centigrade to about 100° Centigrade preferably from about 20° Centigrade to about 80° Centigrade.

It will be obvious from the foregoing that various modifications of what has been specifically described may be utilized without departing from the invention as defined in the following claims.

The embodiments of the invention in which an exclusive property or privilege is claimed are defined as follows:

1. A process for the purification of solids and liquid waste streams from a mercury amalgam chlorine plant employing an aqueous brine stream containing metallic mercury and soluble and insoluble mercury salts comprising
    a. purifying said brine stream by adding sodium carbonate and sodium hydroxide to precipitate said mercury and mercury salts therefrom,
    b. separating said mercury and mercury salts from the brine stream and reacting said mercury and mercury salts with sulfuric acid,
    c. adjusting the pH of the slurry resulting from the reaction of step (b) from about 6.0 to 9.0 and oxidizing all of said metallic mercury and insoluble mercury salts present into soluble mercury salts, with an amount of oxidant sufficient thereto,
    d. filtering the slurry and washing the solids whereupon the solids are removed,
    e. removing residual oxidant, adjusting the pH of the solution from about 2.5 to about 6.0 and precipitating the mercury contained therein by adding an amount of sulfide source sufficient thereto,
    f. filtering off the mercury sulfide and allowing the filtrate to be discharged,
    g. dispersing said mercury sulfide in a brine solution, adjusting the pH to about 8 to 10, oxidizing the mercury forming soluble mercuric chloride,
    h. combining the brine solution of step (g) with said brine stream of step (a).

2. The process of claim 1 wherein the filtrate from step (d) is combined with other plant liquid waste streams.

3. The process of claim 1 wherein the oxidant employed is sodium hypochlorite.

4. The process of claim 1 wherein the oxidant employed is chlorine gas.

5. The process of claim 1 wherein the oxidant employed is hypochlorous acid.

* * * * *